United States Patent [19]

Payne

[11] Patent Number: 5,316,701

[45] Date of Patent: * May 31, 1994

[54] MULTIAXIS ROTATIONAL MOLDING PROCESS

[76] Inventor: LeRoy Payne, 3300 Nicholas La., Molt, Mont. 59057

[*] Notice: The portion of the term of this patent subsequent to Apr. 30, 2008 has been disclaimed.

[21] Appl. No.: 950,135

[22] Filed: Sep. 24, 1992

Related U.S. Application Data

[60] Division of Ser. No. 707,656, May 30, 1991, Pat. No. 5,188,845, which is a continuation-in-part of Ser. No. 417,502, Oct. 5, 1989, Pat. No. 5,022,838, which is a continuation-in-part of Ser. No. 271,686, Nov. 16, 1988, Pat. No. 4,956,133, which is a continuation-in-part of Ser. No. 202,267, Jun. 6, 1988, Pat. No. 4,956,135, which is a continuation-in-part of Ser. No. 890,742, Jul. 30, 1986, Pat. No. 4,749,533, which is a division of Ser. No. 766,498, Aug. 19, 1985, Pat. No. 4,671,753.

[51] Int. Cl.⁵ .................. B28B 1/02; B29C 33/40; B29C 45/00; B29D 11/00

[52] U.S. Cl. .................. 264/1.5; 264/1.7; 264/2.1; 264/2.5; 264/40.1; 264/40.2; 264/40.7; 264/219; 264/225; 264/255; 264/297.1; 264/297.; 264/310; 264/328.8; 264/328.11; 425/150; 425/429; 425/435

[58] Field of Search ............. 264/255, 310, 311, 40.1, 264/40.2, 40.5, 40.6, 40.7, 297.1, 297.2, 301-303, 328.11, 328.6, 328.8, 328.13, 219, 220, 225, 1.1, 1.5, 2.1, 1.7, 2.5, 2.6; 425/435, 429, 147, 145, 150, 148, 143, 144

[56] References Cited

U.S. PATENT DOCUMENTS

| | | | |
|---|---|---|---|
| 3,966,870 | 6/1976 | Vecchiotti | 264/255 |
| 4,043,721 | 8/1977 | Lemelson | 425/435 X |
| 4,104,357 | 8/1978 | Blair | 264/255 |
| 4,146,565 | 3/1979 | Quraishi | 264/310 |
| 4,285,903 | 8/1981 | Lemelson | 264/310 |
| 4,457,729 | 7/1984 | Peerlkamp | 264/310 X |
| 4,548,779 | 10/1985 | Steinberg et al. | 264/310 X |
| 4,571,319 | 2/1986 | Baluch et al. | 264/255 X |
| 4,671,753 | 6/1987 | Payne | 425/435 X |
| 4,749,533 | 6/1988 | Payne | 264/311 X |
| 4,956,133 | 9/1990 | Payne | 264/310 X |
| 4,956,135 | 9/1990 | Payne | 264/311 X |
| 5,011,636 | 4/1991 | Payne | 264/311 X |
| 5,022,838 | 6/1991 | Payne | 264/310 X |
| 5,173,221 | 12/1992 | Payne | 264/311 X |
| 5,188,845 | 2/1993 | Payne | 264/310 X |
| 5,198,159 | 3/1993 | Nakamura et al. | 264/310 X |

*Primary Examiner*—Karen Aftergut
*Attorney, Agent, or Firm*—Arthur L. Urban

[57] ABSTRACT

A method of continuously forming an integrally molded structure in a multiaxis rotational molding operation including the steps of rotating a multimold section mold assembly about at least three axes. A first freshly formed polymerizable mixture is flowed over surfaces of an enclosed mold cavity within the multisection assembly. Flowing of the first mixture over the cavity surfaces and formation of a first resin therefrom is monitored through optical fibers extending through the mold sections. Second and third freshly formed polymerizable mixtures are flowed over resin formed within the mold cavity. Flowing of the second and third mixtures and formation of resins therefrom are monitored through optical fibers extending through the mold sections. The rotation of the multisection mold assembly is continued throughout the modling operation. Each axis rotation of the multisection mold assembly is monitored individually. Flowing of each mixture and each axis rotation are coordinated in a preselected profile to form an integrally molded structure. The mold sections of the multisection mold assembly are separated after the integrally molded structure has achieved structural integrity within the mold cavity and the structure removed. The steps are repeated on a continuing basis.

3 Claims, 1 Drawing Sheet

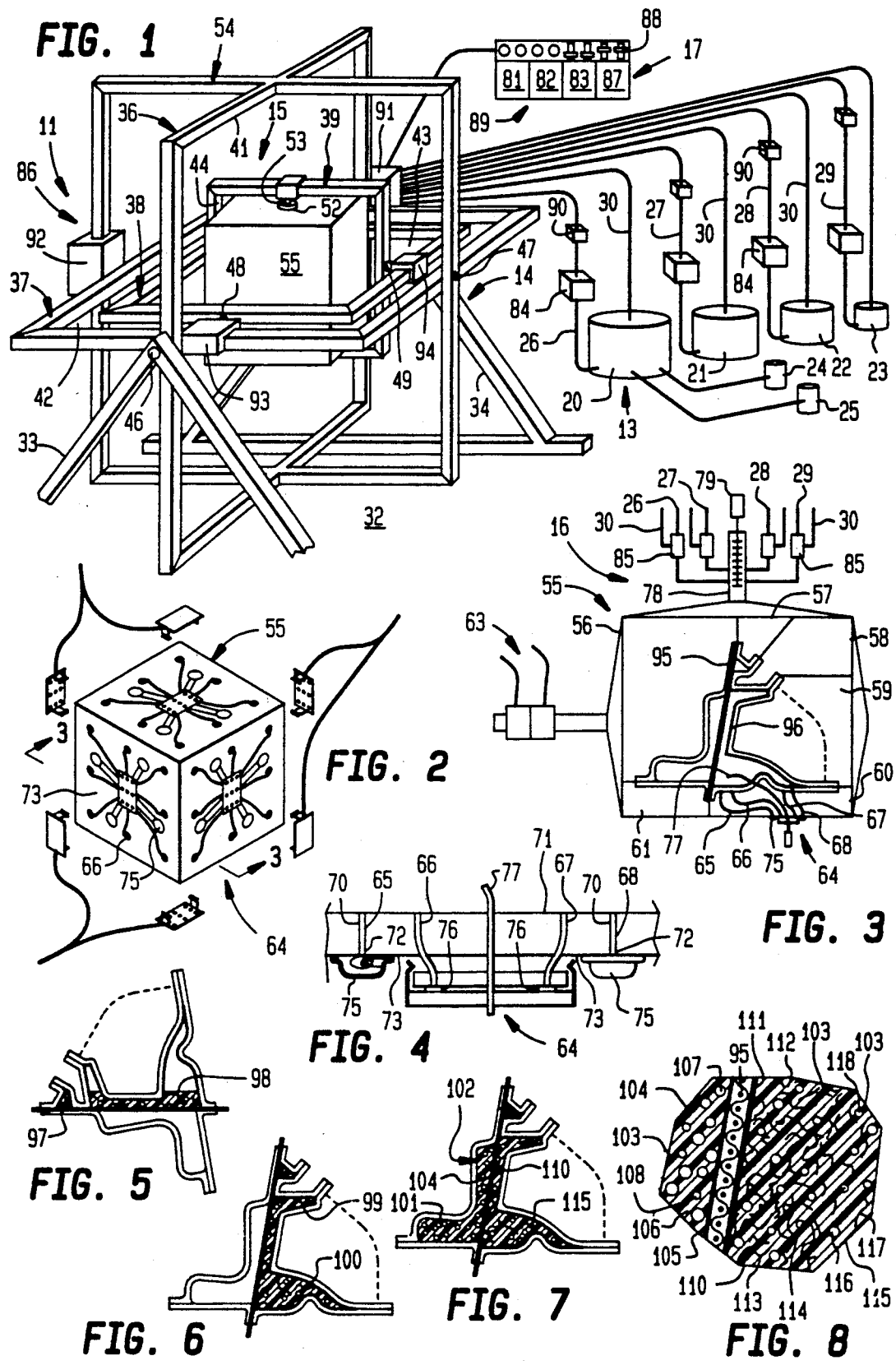

MULTIAXIS ROTATIONAL MOLDING PROCESS

This application is a division of U.S. application Ser. No. 707,656, filed May 30, 1991, now U.S. Pat. No. 5,188,845, which in turn is a continuation-in-part of pending U.S. application Ser. No. 417,502, filed Oct. 5, 1989, now U.S. Pat. No. 5,022,838, which in turn is a continuation-in-part of U.S. application Ser. No. 271,686, filed Nov. 16, 1988, now U.S. Pat. No. 4,956,133, which in turn is a continuation-in-part of U.S. application Ser. No. 202,267, filed Jun. 6, 1988, now U.S. Pat. No. 4,956, 135, which in turn is a continuation-in-part of U.S. application Ser. No. 890,742, filed Jul. 30, 1986, now U.S. Pat. No. 4,749,533, which is a division of U.S. application Ser. No. 766,498, filed Aug. 19, 1985, now U.S. Pat. No. 4,671,753.

This invention relates to a novel molding apparatus and method and more particularly relates to a new multiaxis rotational molding apparatus and method.

Throughout history, one of the most important activities in most civilizations has been the construction of buildings for various purposes such as dwellings, storage and the like. With primitive societies, it was common to construct such buildings from natural materials that were readily available. In forested areas, structures were erected with logs or boards that had been cut from the logs.

Where trees were less available, people used stone for building materials or more commonly artificial adobe substitutes formed from mud baked in the sun. To make artificial stones or bricks more durable and less likely to crumble, it was customary to mix straw or similar materials with the mud. These are believed to be the first reinforced products.

As civilizations developed, the use of reinforced products has become much more widespread. For example, concrete is formed from mixtures of cement and aggregates such as sand, crushed stone, rocks, etc. In addition, for greater strength metal rods, mesh fabric and the like may be incorporated therein. Wood products of this type include plywood and similar laminated units as well as particle board, wafer board and the like.

With the discovery of man-made polymers and resinous materials, the use of fillers and reinforcing materials therein has become common. These materials may be in a variety of forms including particles, fibers, rods, fabrics and the like.

One of the major problems is the proper incorporation of the reinforcing and/or filler materials into the continuous phase or matrix. Unless a high degree of care is exercised when the materials are combined with the principal component, they may be distributed non-uniformly and/or voids, bubbles and other weak spots may be created.

Even with fillers and reinforcing materials which can be properly placed within a matrix easily, there still is the problem of achieving uniformity of the composition of the matrix. For example, concrete mixes which include cement, water and an aggregate can become non-homogeneous simply by settling on standing. As a result, the trucks which deliver such mixes include drums that are rotated continuously in an attempt to maintain uniformity.

This problem of non-uniformity is significant in most batch processes. Although the obvious solution to the shortcomings of batch processes is continuous processing, most products still are produced on a batch or unit basis even though it might be a continuous batch process, that is, individual units or batches fabricated on an assembly line. As a result, reproducable high quality remains a serious problem.

The production of man-made plastics and resins is an industry that utilizes a high degree of automatically controlled continuous processing. However, for units of appreciable size, batch processing still is the rule rather than the exception. For example, in the production of fiberglass structures such as boats, it is customary to construct the hulls by hand, building on an open mold in which a plurality of resin and fiberglass layers are sequentially laminated or a plurality of mixed resin/chopped fiber coatings are applied over the mold.

Such hand building procedures require a large amount of labor, supervision and continuous inspection to insure that a reasonable level of quality is achieved. This greatly increases the cost of the product.

The problems of batch processing become more complicated when the resins or polymers are foam-forming. As a multi-component mixture is placed into an open mold, the first part of the mixture begins to foam and grow from the bottom of the mold as a result of an exothermic chemical reaction. The bubble size of the foam is smallest at the bottom where the reaction begins and is largest at the top of the mold as the reaction draws to completion. The resulting product is non-uniform in density from top to bottom and thus has poor structural strength and is unsatisfactory.

In view of the above discussion, it is clear that present molding apparatus, methods and procedures do not provide the operating efficiencies and design possibilities required currently and in the future. Thus, there is a need for new molding apparatus and procedures that facilitate the production of products having a high degree of quality and uniformity.

The present invention provides a novel molding apparatus and method which not only overcome the deficiencies of present technology but also provide features and advantages not found in earlier expedients. The multiaxis rotatable molding apparatus and method of the invention provide a simple and convenient means for the production of uniform high quality products efficiently and inexpensively.

The multiaxis rotational molding apparatus of the present invention is simple in design and can be produced relatively inexpensively. Commercially available materials and components can be utilized in the manufacture of the apparatus. Conventional metal fabricating procedures can be employed by semi-skilled labor in the manufacture of the apparatus. The apparatus is durable in construction and has a long useful life with a minimum of maintenance.

The molding apparatus and method of the invention can be modified to mold a wide variety of new structures. Variations both in product configuration and composition can be attained simply and conveniently with the apparatus and method of the invention. Even with such variations, uniformity and quality of product dimensions and shapes are still maintained without difficulty.

These and other benefits and advantages of the novel multiaxis rotatable molding apparatus and method of the present invention will be apparent from the following description and the accompanying drawings in which:

FIG. 1 is a view in perspective of one form of multiaxis rotatable molding apparatus of the invention;

FIG. 2 is an enlarged view in perspective of a mold assembly of the apparatus shown in FIG. 1;

FIG. 3 is a side view in section of the mold assembly shown in FIGS. 1 and 2 taken along line 3—3 of FIG. 2 during an early step of a method of the invention;

FIG. 4 is a further enlarged fragmentary sectional side view of the mold assembly shown in FIG. 3;

FIG. 5 is a schematic illustration in section of the mold cavity shown in FIG. 3 during an intermediate step in a molding method of the invention;

FIG. 6 is a schematic illustration in section of the mold cavity shown in FIG. 3 during a subsequent step in a molding method of the invention;

FIG. 7 is a schematic illustration in section of the mold cavity shown in FIG. 3 during a late step in a molding method of the invention; and FIG. 8 is an enlarged fragmentary cross-sectional view of a molded unit of the invention shown in FIG. 7.

As shown in the drawings, one form of multiaxis rotational molding apparatus 11 of the present invention includes a raw material supplying portion 13, a supporting portion 14, a molding portion 15, a mixing portion 16 and a control portion 17.

The raw material supplying portion 13 of the molding apparatus 11 of the invention includes a plurality of reservoirs 20, 21, 22, 23, 24 and 25. These reservoirs may include storage chambers for resin-forming materials, fillers, reinforcements, colors, catalysts, foam-forming materials, other additives, inert mixtures and the like. Reservoirs 24 and 25 are connected with reservoir 20 for premixing of inert materials therein prior to transfer to the mixing portion 16.

Reservoirs 20, 21, 22 and 23 of the raw material supplying portion 13 are independently connected to the mixing portion 16 through conduit means 26, 27, 28 and 29. Advantageously, separate bypass return conduit means 30 extend from one end of each conduit 26-29 adjacent the mixing portion back to the respective reservoir 20-23 as illustrated in FIG. 1.

The supporting portion 14 of apparatus 11 of the present invention includes a base surface 32 with generally parallel upstanding end sections 33 and 34. A plurality of frame members 36, 37, 38 and 39, each with a large open central area 41, 42, 43 or 44, extends between the upstanding end sections and is rotatably supported thereon. Advantageously, each of the inner frame members 37, 38 and 39 is progressively smaller in size and is disposed within an open central area of the next larger frame member.

Alternate frame members shown in the drawings as members 36 and 38 preferably are rotatable about aligned axes 46 and 48. The frame members therebetween 37 and 39 are rotatable about aligned axes 47 and 49 generally perpendicular to the first axes 46 and 48. The smallest frame member 39 includes rotatable holding sections 52 that extend inwardly along an axis 53 that also is perpendicular to axis 49 of that frame member.

Advantageously, the smaller frame members 37, 38 and 39 are generally centered within the open central area 41, 42 and 43 of the next larger frame members 36, 37 and 38 respectively. The outer largest frame member 36 preferably includes a cross frame section 54. The cross frame section 54 advantageously is disposed in a plane substantially perpendicular to a plane through the outer frame member 36. The cross frame section preferably is disposed symmetrically of the outer frame member 36.

The frame members 36-39 advantageously are of a generally multi-angular configuration. Preferably, the frame members are of a quadrangular configuration and most preferably a square configuration as shown in the drawings. The frame members advantageously are formed of tubing, preferably with a quadrangular, e.g. square cross section. Advantageously, the raw material conduits 26-29 and electrical conductors for energizing drive means are disposed along the frame members.

The molding portion 15 of the apparatus 11 includes at least one rotatable mold assembly 55. The mold assembly includes at least two mold sections shown in FIG. 3 as sections 56-61. Mold assembly 55 also includes mold orienting means 63 for the respective mold sections.

The mold sections include molding monitors 64 e.g. at least two optical fiber elements shown as elements 65, 66, 67 and 68. The optical fiber elements extend through the mold sections as shown in FIGS. 3 and 4. One end 70 of each optical fiber element terminates at a mold cavity forming surface 71 of the mold section. An opposite end 72 of each optical fiber element terminates at a remote second surface 73 of the mold section.

Signal generating means 75 is disposed adjacent a remote surface end 72 of one optical fiber element 65 and signal sensing means 76 is disposed adjacent a remote surface end 72 of another optical fiber element 66. The signal generating means 75 advantageously may include light generating means, sound generating means, laser means or the like. Similarly, the signal sensing means 76 includes sensing means for the particular signal being generated, that is, light sensing means, heat sensing means, sonar sensing means or the like.

In addition to the above expedients, other signal generating and sensing means such as those employed in medical procedures for patient diagnosis may be useful. As is common in such procedures, the signal generating optical fiber and the signal sensing optical fiber can be combined in a common probe. The particular molding monitor employed will depend upon the specific configuration of the mold cavity of the product being molded, the rotational profile required, the formulations of the mixtures introduced into the mold cavity as well as other peculiarities of the molding method being utilized.

Preferably, at least one optical fiber element is located in each mold section with a plurality of optical fiber elements located in the mold sections. The mold assembly 55 advantageously includes an optical fiber probe member 77 and preferably a deformable probe member.

The mixing portion 16 of the molding apparatus 11 of the invention includes a raw material mixing chamber 78. The mixing chamber is mounted adjacent the molding portion 15. Continuous raw material mixing means 79 is disposed within the chamber 78.

The control portion 17 of the molding apparatus 11 of the invention includes programmable memory means 81 and actuating means 82 responsive thereto in combination with coordinating means 83 to control the operation of pumps 84, valves 85 and drives 86. Preferably, the coordinating means includes a process controller 87 that initiates changes in the flows of materials and speeds of drives to bring variations therein back to the rates specified in the programs present in the memory 81.

This coordination commonly is achieved through the transmission of information such as digital pulses from the monitors and/or sensors at the control components to the process controller 87. The operating information is compared with the preselected programming parameters stored in the memory 81. If differences are detected, instructions from the controller change the operation of the components to restore the various operations to the preselected processing specifications.

In the use of the multiaxis molding apparatus 11 of the present invention, the design of the product desired first is established. Then, the design is programmed into the memory 81.

To start the operation of the apparatus 11, buttons and/or switches 88 of a control panel 89 are depressed to activate the memory 81 and the other components of the control portion 17. The coordinating means 83 energizes frame member rotation drive means 91-94.

Also, the pumps 84, the valves 85 and the flow monitors 90 are energized by the coordinating means 83 in the preselected sequences of the program stored in the memory 81. This causes the raw materials in reservoirs 20-23 to advance along the conduits 26-29 toward the mixing portion 16. For example, to mold a product including a foamed polyurethane resin, reservoir 20 may contain a previously prepared mixture of an isocyanate and gravel as a filler from reservoirs 24 and 25, reservoir 21 may contain a polyol, reservoir 22 foam forming materials and 23 and other reservoirs-colors, catalysts, etc. as required.

To produce high quality molded units of the invention, it is important that the raw material delivered to the mixing chamber 78 be uniform in volume and composition. This can be facilitated by providing a continuous flow of raw materials to the mixing portion and the immediate transfer of the mixture therefrom onto the cavity surface of the mold assembly. However, the volume of the mixture delivered will vary depending upon the particular incremental area being covered at any instant. Also, the delivery will be terminated completely when a molded unit is being removed from the apparatus.

Advantageously, as shown in FIG. 3, a separate bypass conduit 30 is utilized from the end of each conduit 26-29 at a point adjacent the mixing chamber 78 back to the respective reservoir 20-23. This construction provides for the delivery of a freshly formed uniform mixture from the mixing chamber even though the distance is considerable between the reservoirs and the mixing chamber which is located closely adjacent the mold assembly 55. The control portion 17 coordinates the operation of the various system components so the required formulation can flow onto the desired areas of the mold cavity.

Rotation of the frame sections 36-39 is started and continues while each freshly formed polymeric mixture is transferred from mixing chamber 78 into the cavity of mold assembly 55. The rotation is continued to complete the flow of the mixture over all areas being covered. The rotations are controlled within the parameters stored in the memory 81. For particular units, the rotations about the respective axes may be continuous and/or intermittent at changing rates. Also, it may be desirable to provide arcuate rotation, that is, movement about an arc such as a rocking motion. Molding monitors 64 located adjacent the mold assembly inform the process controller 87 when each polymeric mixture has flowed over preselected areas of the mold cavity so the controller can initiate the next step of the molding method.

FIGS. 3-7 illustrate schematically the molding of an integrally formed structural unit. FIG. 3 shows the formation of a covering layer 96 over the right part of a mold cavity formed by the assembly of mold sections 56-61. The covering is confined to the right part of the mold cavity by inserting a separator mat 95 between the mold sections during the assembly thereof. An open central area is maintained by flowing a first polymerizable mixture over the surface of the mold cavity through rotation of the mold assembly 55 in a preselected rotational profile until the covering has set in contact with the cavity surface.

To form a roll bar section, mold assembly 55 is oriented in the position shown in FIG. 5 and a second polymerizable formulation is introduced into the mold cavity. The second mixture which includes a high concentration of metal or other high strength fibers is allowed to set while the mold assembly is at rest. This confines the resin structure formed in preselected areas 97 and 98 of the mold cavity.

Thereafter, as shown in FIG. 6, rotation of mold assembly 55 is resumed in a pre-selected rotational profile and a third polymerizable mixture is introduced into the mold cavity. The third mixture substantially fills the open area within the covering 96. The third mixture advantageously includes a particulate reinforcing material such as gravel and a small amount of a foam-forming material with resin-forming components. The components of the third mixture quickly begin to react to form a solid structure while rotational movement of the mold assembly continues. The foam that is formed expands to fill the cavities 99 and 100.

To fill the left side of the mold cavity, a fourth polymerizable mixture is introduced into the left cavity. The mixture includes a higher concentration of a foam-forming material to form a resilient foam. The mixture initially deposited forms a thin high density skin over the surface of the left mold cavity with little or no bubble formation. As the reaction rate increases due to the exothermic reaction in the resin formation, many bubbles are formed decreasing the density of foam 101 and filling the left part of the mold cavity.

When the molded unit within the mold cavity is sufficiently cured that it possesses structural integrity, rotation is stopped and the mold sections 56-61 are separated to free the unit. The molded unit then may be set aside to complete foam formation and/or the curing of the resin therein. During this period, the final expansion of the foam, free of the mold's restraint, stresses the high density outer skin or layer of the unit. This stressing of the skin increases the strength and puncture resistance thereof and also the structural strength of the unit itself.

Molded unit 102 is an integral structure which fulfills a number of functions in a vehicle, namely, a seat on the left, a roll bar in the center and a trunk compartment on the right. Conventional vehicle body construction requires the individual fabrication of a seat, a roll bar and a trunk compartment independently and the assembly of the three fabricated structures to provide a similar combination of features only after a considerable expenditure of time, labor and material. The structural integrity to a large extent would depend upon the care taken in the fabrication of the three components and on the assembly thereof.

In contrast, the molded unit of the present invention formed utilizing the apparatus and method of the invention results in the formation of an integral structure which is molded in one operation automatically under closely controlled conditions quickly and efficiently and with a high level of quality and at low cost.

FIG. 8 illustrates an enlarged fragmentary sectional view of molded unit 102 at the juncture of the seat, roll bar and trunk sections including a continuous resin matrix 103. Seat section 104 includes a thin stressed outer layer 105 over a resilient foam section 106 including a plurality of gas bubbles 107 and filler particles 108. Roll bar section 110 includes an outer covering 111 over a dense main section 112 with a large concentration of high strength fiber reinforcements 113 and hard filler particles 114 in resin matrix 103. Trunk section 115 includes a lesser number of gas bubbles 116 than seat section 104 and fewer metal fibers 117 and hard filler particles 118 in resin matrix 103 than roll bar section 110. Each combination provides optimum performance for the particular function contemplated.

Mold sections 56–61 may be formed employing the apparatus and method of the present invention. To form the optical fiber elements, rods or tubes can be positioned within a mold cavity prior to molding in the orientation desired for the final mold sections. Then, the mold section matrix is molded first, the tubular members pulled out of the matrix and the passages remaining in the matrix filled with a signal transmitting polymerizable mixture in a subsequent molding step to provide in situ formation of the optical fiber elements.

The above description and the accompanying drawings show that the present invention provides a novel multi-axis rotational molding apparatus and method which not only overcome the deficiencies and shortcomings of earlier expedients, but in addition provide novel features and advantages not found previously. The apparatus and method of the invention provide simple and convenient means for producing uniform high quality products efficiently and inexpensively.

The apparatus of the invention is simple in design and relatively inexpensive. Commercially available materials and components can be utilized in the fabrication of the apparatus using conventional metal working techniques and procedures.

Products can be produced automatically with the apparatus and method of the invention by operators with limited experience and aptitude after a short period of instruction. The apparatus is durable in construction and has a long useful life with a minimum of maintenance.

The apparatus and method of the invention can be utilized to mold a wide variety of different products. Variations in structure, configuration and composition of the products can be achieved simply and quickly with the apparatus and method of the invention.

It will be apparent that various modifications can be made in the multiaxis rotational molding apparatus and method described in detail above and shown in the drawings within the scope of the present invention. The size, configuration and arrangement of components and materials can be changed to meet specific requirements. For example, the number of components and reservoirs may be different. Also, the apparatus may include other drive and actuating components and mechanisms. Additional steps can be included in the method. These and other changes can be made in the apparatus and method described provided the functioning and operation thereof are not adversely affected. Therefore, the scope of the present invention is to be limited only by the following claims.

What is claimed is:

1. A method of continuously forming an integrally molded structure in a multiaxis rotational molding operation including the steps of rotating a multisection mold assembly about at least three axes, flowing a first freshly formed polymerizable mixture over surfaces of an enclosed mold cavity within said multisection mold assembly, monitoring said flowing of said first mixture over said mold cavity surfaces and formation of a first resin therefrom through optical fibers extending through said mold sections, flowing a second freshly formed polymerizable mixture over said first resin formed within said mold cavity with said first mixture, monitoring said flowing of said second mixture and formation of a second resin therefrom through optical fibers extending through said mold sections, flowing a third freshly formed polymerizable mixture over said second resin formed within said mold cavity with said second mixture, monitoring said flowing of said third mixture and formation of a third resin therefrom through optical fibers extending through said mold sections, continuing said rotation of said multisection mold assembly throughout said steps of said continuous molding operation while monitoring individually each axis rotation of said multisection mold assembly, and coordinating said monitored flowing of each mixture and said monitored formation of each resin with each monitored axis rotation in a preselected profile to form said integrally molded structure of said first, second, and third resins, separating said mold sections of said multisection mold assembly after said integrally molded structure has achieved structural integrity within said mold cavity, removing said integrally molded structure from said separated mold sections and repeating said steps to form a multiplicity of said integrally molded structures of said first, second, and third resins on a continuing basis.

2. A method of continuously forming an integrally molded structure in a multiaxis rotational molding operation according to claim 1 including the step of inserting preformed separating means between said mold sections of said mold assembly.

3. A method of continuously forming an integrally molded structure in a multiaxis rotational molding operation as claimed in claim 16 further including the in situ formation of optical fiber elements by the steps of positioning preformed elongated tubular members in a preselected orientation within said enclosed mold cavity of said multisection mold assembly, rotating said mold assembly about at least three axes and flowing said first, second, and third polymerizable mixtures over said mold cavity surfaces, setting said first, second, and third polymerizable mixtures in a preselected configuration, removing said preformed elongated tubular members from said set configuration while it is within said mold cavity, flowing a signal transmitting polymerizable mixture into passages in said set configuration from which said tubular members have been removed while rotating said mold assembly and setting said signal transmitting polymerizable mixture within said passages to form said integrally molded structure with optical fiber elements therein.

* * * * *